United States Patent
Pirwani et al.

(10) Patent No.: US 9,207,094 B2
(45) Date of Patent: Dec. 8, 2015

(54) ROAD HEIGHT GENERATION FOR A ROAD NETWORK

(75) Inventors: Imran A. Pirwani, Campbell, CA (US); Paul S. McCarthy, San Jose, CA (US)

(73) Assignee: Apple Inc., Cupertino, CA (US)

( * ) Notice: Subject to any disclaimer, the term of this patent is extended or adjusted under 35 U.S.C. 154(b) by 205 days.

(21) Appl. No.: 13/601,689

(22) Filed: Aug. 31, 2012

(65) Prior Publication Data

US 2013/0332063 A1    Dec. 12, 2013

Related U.S. Application Data

(60) Provisional application No. 61/657,829, filed on Jun. 10, 2012.

(51) Int. Cl.
   *G01C 21/26*    (2006.01)
   *G01C 21/36*    (2006.01)
   *G01C 21/32*    (2006.01)

(52) U.S. Cl.
   CPC ............ *G01C 21/3638* (2013.01); *G01C 21/32* (2013.01)

(58) Field of Classification Search
   CPC .... G01C 21/26; G01C 21/32; G01C 21/3647; G09B 29/007; G06K 9/00651; G06K 9/4609; G08G 1/096838
   USPC ......... 701/200, 201, 207, 208, 210, 300, 533; 700/259; 345/419, 853; 606/69; 382/294, 307; 340/995.1
   See application file for complete search history.

(56) References Cited

U.S. PATENT DOCUMENTS

| | | | |
|---|---|---|---|
| 3,490,019 A | | 1/1970 | Jessen |
| 5,720,067 A | * | 2/1998 | Grearson ........................ 14/73 |
| 5,832,400 A | | 11/1998 | Takahashi et al. |
| 7,869,667 B1 | * | 1/2011 | Wu .............................. 382/307 |
| 8,271,195 B2 | * | 9/2012 | Painter et al. .................. 701/533 |
| 2002/0070934 A1 | | 6/2002 | Sakamoto et al. |
| 2002/0116147 A1 | | 8/2002 | Vock et al. |
| 2002/0179708 A1 | | 12/2002 | Zhu et al. |

(Continued)

FOREIGN PATENT DOCUMENTS

| | | | |
|---|---|---|---|
| CN | 101353882 A | * | 1/2009 |
| CN | 103115609 A | * | 5/2013 |

(Continued)

OTHER PUBLICATIONS

"Working with TIGER/Line Shapefiles", 2 pages, US Census Bureau, Jun. 2009.*

(Continued)

*Primary Examiner* — James Trammell
*Assistant Examiner* — Sanjeev Malhotra
(74) *Attorney, Agent, or Firm* — Kilpatrick Townsend & Stockton LLP

(57) ABSTRACT

Road height values for a road network area are generated based on locations of junctions and stacking orders of roads in junctions in which at least one road passes over another road. A cost function can be optimized to obtain height values for each road of each junction. The cost function can be constrained such that roads of the grade separated crossings satisfy the stacking order designated for the roads and to have a minimum distance between roads having consecutive stacking order values. The obtained height values can be used for rendering a three-dimensional map of a part of the road network area.

19 Claims, 13 Drawing Sheets

(56) References Cited

U.S. PATENT DOCUMENTS

| | | |
|---|---|---|
| 2004/0027344 A1* | 2/2004 | Ohto .............................. 345/419 |
| 2004/0049341 A1* | 3/2004 | Fujiwara ....................... 701/210 |
| 2004/0121829 A1 | 6/2004 | Reed |
| 2004/0236506 A1* | 11/2004 | Kolb et al. .................... 701/208 |
| 2004/0239701 A1* | 12/2004 | Crichton ....................... 345/853 |
| 2005/0065521 A1* | 3/2005 | Steger et al. .................... 606/69 |
| 2005/0107993 A1 | 5/2005 | Cuthbert et al. |
| 2005/0196019 A1 | 9/2005 | Taniguchi et al. |
| 2005/0251332 A1 | 11/2005 | Entenmann et al. |
| 2006/0015249 A1 | 1/2006 | Gieseke |
| 2007/0021910 A1* | 1/2007 | Iwami et al. ................. 701/210 |
| 2007/0114732 A1 | 5/2007 | Dellacha |
| 2007/0122058 A1 | 5/2007 | Kitaura et al. |
| 2007/0192020 A1* | 8/2007 | Brulle-Drews et al. ....... 701/200 |
| 2009/0189783 A1 | 7/2009 | Koitabashi |
| 2009/0216451 A1 | 8/2009 | Barnes et al. |
| 2009/0237269 A1 | 9/2009 | Okugi et al. |
| 2010/0082252 A1 | 4/2010 | Asanuma |
| 2010/0198505 A1* | 8/2010 | Painter et al. ................. 701/207 |
| 2010/0204916 A1* | 8/2010 | Garin ............................ 701/208 |
| 2010/0280988 A1 | 11/2010 | Underkoffler et al. |
| 2011/0106313 A1* | 5/2011 | Lee et al. ..................... 700/259 |
| 2011/0109482 A1* | 5/2011 | Haran ........................ 340/995.1 |
| 2011/0137561 A1* | 6/2011 | Kankainen ................... 701/300 |
| 2011/0147665 A1 | 6/2011 | Neagle et al. |
| 2011/0172903 A1* | 7/2011 | Farr .............................. 701/201 |
| 2012/0095682 A1 | 4/2012 | Wilson |
| 2012/0177305 A1* | 7/2012 | Wu ............................... 382/294 |

FOREIGN PATENT DOCUMENTS

| | | | |
|---|---|---|---|
| CN | 103115609 A | * | 5/2013 |
| CN | 103675506 A | * | 3/2014 |
| EP | 1912176 A1 | | 4/2008 |

OTHER PUBLICATIONS

"Utilizing Data from American FactFinder with TIGER/Line Shapefiles in ArcGIS", 21 pages, US Census Bureau, 1990-2010.*

"TIGER/Line Files 2000—Technical Documentation", 309 pages originally, US Census Bureau, Oct. 2001—attached herewith in 5 parts.*

Office Action mailed Nov. 20, 2014 in U.S. Appl. No. 13/689,135 22 pages.

"Aircraft Principal Axes," Wikipedia article, printed on Mar. 26, 2015, 3 pages.

Office Action mailed Apr. 3, 2015 in U.S. Appl. No. 13/689,135, 21 pages.

* cited by examiner

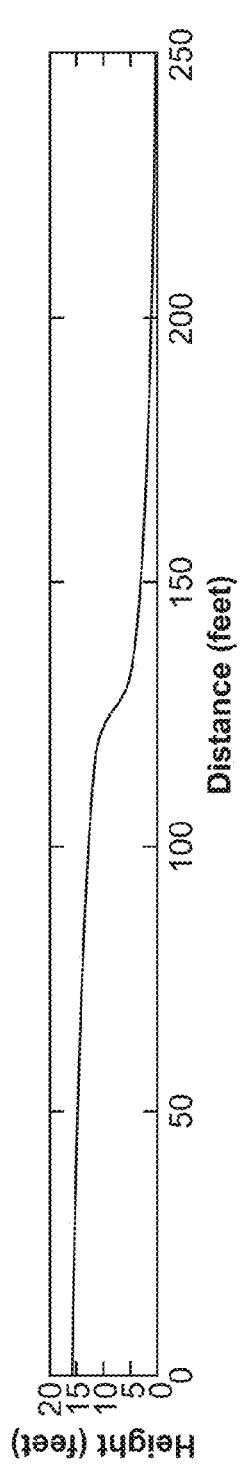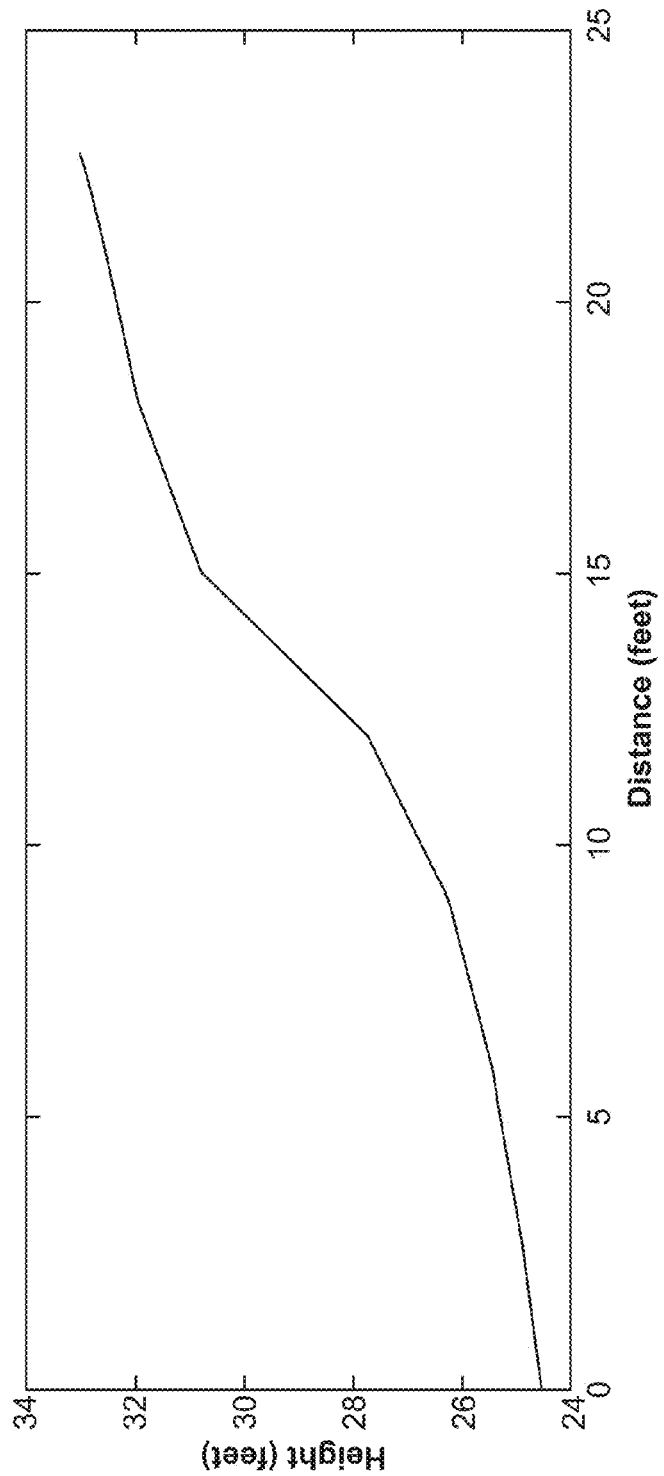
FIG. 11A
FIG. 11B

ROAD HEIGHT GENERATION FOR A ROAD NETWORK

CROSS-REFERENCE TO RELATED APPLICATIONS

The present application claims priority from and is a non-provisional application of U.S. Provisional Application No. 61/657,829, entitled "ROAD HEIGHT GENERATION FOR A ROAD NETWORK" filed Jun. 10, 2012, the entire contents of which are herein incorporated by reference for all purposes.

BACKGROUND

The present disclosure generally relates to three-dimensional road maps, and more specifically to determining a three-dimensional road map given relative orderings at intersections, and potentially providing the three dimensional road map to a navigation device for displaying road views.

A device featuring global positioning system (GPS) navigation typically receives GPS signals to determine the current location of the device. A GPS navigation system may display the location of the device relative to a road depicted in a map image to aid in navigation. For example, a navigation system may show an icon representing a vehicle in which the device is located relative to an image of a road within a map. As the device travels along a road toward an intersection (an example of a junction), the navigation system may show the icon gradually advancing toward an intersection shown in the map image. In some cases, a road of an intersection may pass over another road of the intersection. Because the navigation application displays a two-dimensional image of the intersection, it may not be possible for the driver to determine from the displayed image that a road passes over another road. And, even if the navigation device did know an ordering of the height of the roads, the image would be disorienting (e.g., the image might just show one road disappearing) since no height information leading up to an overpass (another example of a junction) is available.

Additionally, since such devices only receive two-dimensional information, the user has no sensory cues about the terrain he/she will travel on or is currently traveling on, at least not from the navigation device. Given the flat two-dimensional views, or even projecting the two-dimensional view onto a three-dimensional scene, providing directions via such navigational devices can be confusing. However, determining three-dimensional images of a road map is not straightforward unless one measures road heights or gradients, which would be very expensive.

Therefore, it is desirable to provide plausible three-dimensional road maps using existing two-dimensional road map information with simple stacking information at junctions.

BRIEF SUMMARY

Embodiments of the present invention provide methods and apparatus that generate road height values based on road network data including location information corresponding to junctions in the road network and a stacking order of each road in each junction. The height values can be obtained from optimizing a cost function subject to one or more constraints, such as a minimum height separating consecutive roads of a junction. The road height values can be provided to a device display for rendering of a three dimensional image of navigation data.

According to one embodiment, a method generates road height values for a road network area. The road network area can include a plurality of junctions where two or more roads meet. Some of the junctions may be grade separated crossings, in which at least one road passes over another road. The roads of a grade separated crossing can have a stacking order that indicates which roads of the grade separated crossing cross over other roads. A computing device can receive a data set for each junction of a road network area. Each road data set can include a road designation, a first coordinate, a second coordinate, and a stacking order for each road of the junction. The junctions can include grade separated crossings. The computing device can determine height variables that provide an optimal value for a cost function based on the road data set for each junction. When determining the height values, the roads of the grade separated crossings can be constrained to satisfy the stacking order indicated in the road data sets and to have a minimum distance between roads having consecutive stacking order values. The computing device optimizes the cost function to obtain the height values for each road of each junction. The computing device can transmit the obtained height values to a controller for rendering a three-dimensional map of a part of the road network area.

In certain embodiments, a plurality of road data sets are received including a road data set for each junction in the road network area. Each data set can include at least one of a road designation, a first coordinate, a second coordinate, and a stacking order for each road of a junction. The junctions can include grade separated crossings. The computing device can generate a plurality of polylines based on the road data sets. Each polyline can correspond to a road of the road network. The polylines can be divided at junctions such that no pair of polylines cross. The computing device can determine height variables that provide an optimal value for a cost function based on the road data set for each junction. When determining the height values, the roads of the grade separated crossings can be constrained to satisfy the stacking order indicated in the road data sets and to have a minimum distance between roads having consecutive stacking order values. The computing device optimizes the cost function to obtain the height values for each road of each junction. The computing device can transmit the obtained height values to a controller for rendering a three-dimensional map of a part of the road network area.

In other embodiments, spatially dense regions in a road network area are identified. The road network area is divided into sectors having edges designated at spatially dense regions that are equidistant from neighboring spatially dense regions. An enforced height can be applied to junctions at the edges. For each sector, a cost function can be optimized to determine height values for each road of each junction of the road network area. The sectors can be reassembled into a road network map.

Other embodiments are directed to systems, portable consumer devices, and computer readable media associated with methods described herein.

According to another embodiment, a portable device can have a user interface including a display. The display may be configured to display a navigation image. The portable device can also include a network interface. The network interface may have receiving components for receiving global positioning system (GPS) signals and transceiver components for communicatively coupling the portable device to a road height generation system. The portable device can also have a controller to receive height values from the road height generation system via the network interface. The height values can be generated by a processing subsystem of the road height generation system. The processing subsystem can be configured to receive a data set for each junction in a road network area. Each road data set can include a road designation, a first coordinate, a second coordinate, and a stacking order for each road of a respective junction. The junctions can include grade separated crossings. The processing subsystem can determine height variables that provide an optimal value for a cost function based on the road data set for each junction. When determining the height values, the roads of the grade separated crossings can be constrained to satisfy the stacking order indicated in the road data sets and to have a minimum distance between roads having consecutive stacking order values. The processing subsystem optimizes the cost function to obtain the height values for each road of each junction. The processing subsystem can transmit the obtained height values to a controller for rendering a three-dimensional map of a part of the road network area.

To better understand the nature and advantages of the present invention, reference should be made to the following description and the accompanying figures. It is to be understood, however, that each of the figures is provided for the purpose of illustration only and is not intended as a definition of the limits of the scope of the present invention.

BRIEF DESCRIPTION OF THE DRAWINGS

FIGS. 11A-11B are exemplary polyline profiles generated in accordance with an embodiment of the present invention.

DETAILED DESCRIPTION

Embodiments of the present invention relate to determining road height values based on input data indicating a stacking order of roads at junctions (e.g. intersections and overpasses) of a road network. Plausible road height values can be determined at junctions and at locations away from junctions.

To determine the road height values, a cost function can be used as part of an optimization procedure. The determined height values are determined based on various constraints that may be applied to the optimization. For example, a constraint of a minimum height difference between roads of grade separated crossings, e.g., 18 ft., can be specified for overpasses. As another example, the optimization can minimize a height change between neighboring junctions. The height values can be used to present a three-dimensional visualization of relative road heights with a navigation system.

I. 3D Images for Road Navigation

Figure 1:
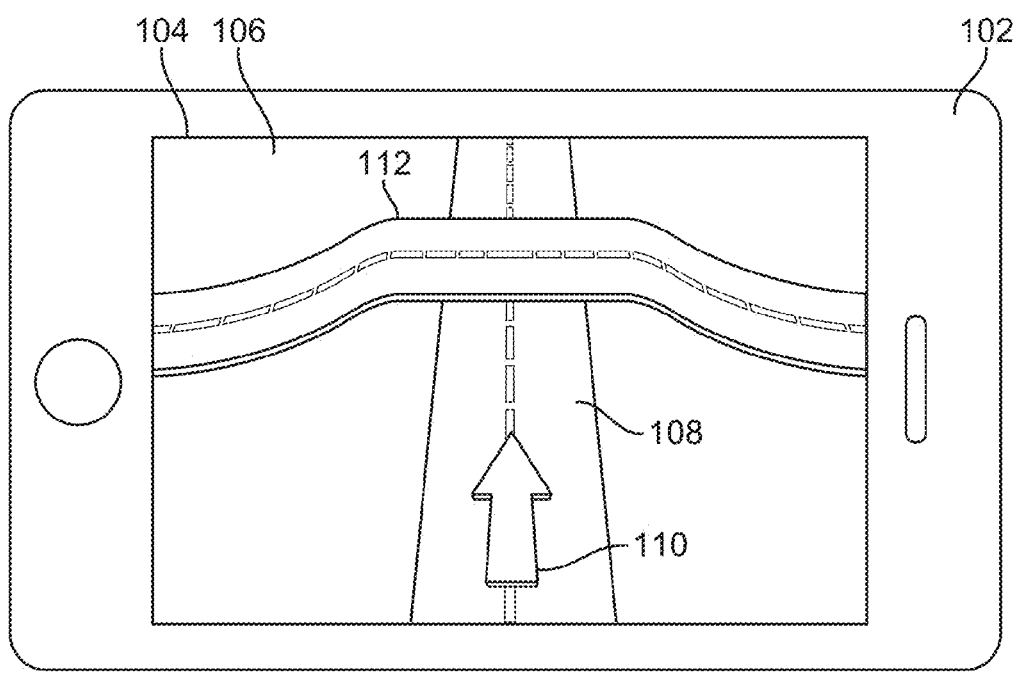
FIG. 1 is a portable device displaying a three-dimensional image rendered by a navigation system, in accordance with an embodiment of the present invention.

FIG. 1 shows information generated by a navigation system displayed on a portable device, according to an embodiment of the invention. Portable device 102 can be, for example, a portable communications device, a standalone navigation device, or a navigation head unit for an automobile. In some embodiments, a navigation application executed by portable device 102 receives navigation data including road height data associated with one or more roads in the vicinity of the portable device. The navigation application can render navigation data as an image 106 on display 104 of the portable device. Navigation image 106 shows road of travel 108. In some embodiments, an icon 110 representing portable device 102 is shown to indicate the location of portable device 102 relative to road of travel 108. If portable device 102 is approaching a junction, navigation image 106 can show the location of the junction relative to the location of portable device 102. A junction can have a road that passes over another road. For example, overpass road 112 may pass over road of travel 108. Using road height values calculated in accordance with embodiments of the invention, the navigation image can show a three dimensional image in which overpass road 112 is shown passing over road of travel 108.

For example, portable device 102 may receive a first road height value corresponding to the portion of road of travel 108 occupied by portable device 102. Portable device 102 may also receive a second road height value corresponding to the portion of overpass road 112 that passes over road of travel 108. In some embodiments, portable device 102 receives the first road height and the second road height from a road height generation system, such as a server, to which portable device 102 is communicatively connected. Navigation image 106 can be rendered such that road of travel 108 is shown at the first height and overpass road 112 is shown at the second height.

Although the navigation data is shown displayed on a portable device, it will be recognized that navigation data generated in accordance with embodiments of the invention can be displayed on any system capable of receiving and displaying map data. For example, it may be desirable to view map data including relative road heights on a display of a personal computer.

II. Portable Device and Server

Figure 2:
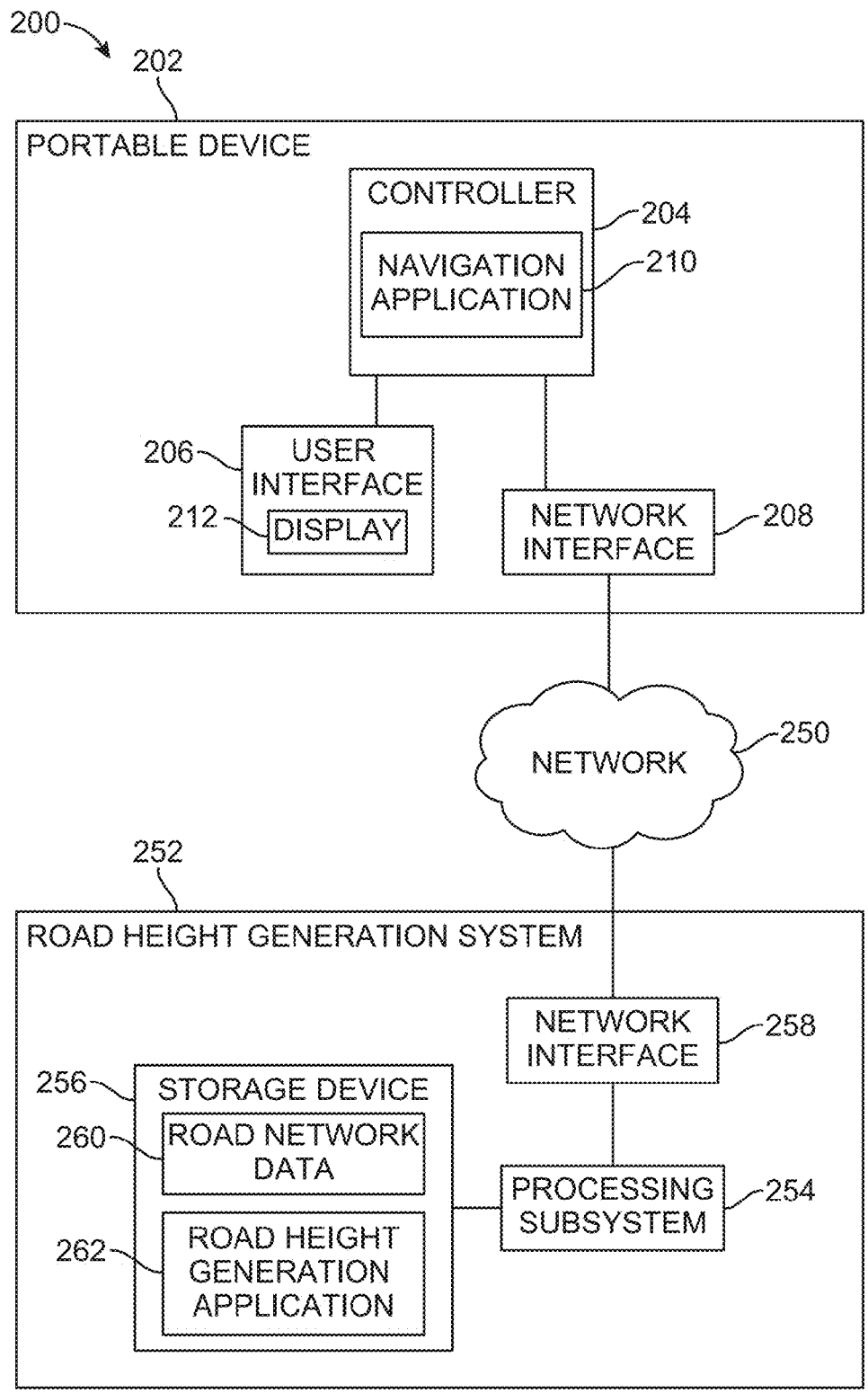
FIG. 2 is a block diagram of a system including a portable device and road height generation system, according to an embodiment of the present invention.

FIG. 2 is a simplified block diagram of a system 200 including a portable device 202 and road height generation system 252 according to an embodiment of the present invention. In this embodiment, portable device 202 (e.g., implementing portable device 102 of FIG. 1) can provide computing, communication, and/or navigation capability. Portable device 202 may be, for example, a device having a GPS navigation system, such as a dedicated GPS device or a multipurpose device enabled to run a GPS navigation application. In some embodiments, portable device 202 can include standalone GPS devices, vehicle head units, and portable devices such as portable media players, smart phones, tablet computers, and laptop computers. Portable device 202 can include controller 204, user interface 206, and network interface 208.

Controller 204 can include, e.g., one or more single-core or multi-core microprocessors and/or microcontrollers executing program code to perform various functions associated with portable device 202. For example, through suitable programming, controller 204 can execute a navigation application 210 stored on controller 204. Controller 204 can also execute other programs to control other functions of portable device 202.

User interface 206 can include input devices such as a touch pad, touch screen, scroll wheel, click wheel, dial, button, switch, keypad, microphone, or the like. User interface 206 may also include output devices, such as display 212. Display 212 may display navigation data including a depiction of a road passing over another road (e.g., navigation image 106 of FIG. 1). Additional output devices of user interface 206 may include indicator lights, speakers, headphone jacks, or the like, together with supporting electronics (e.g., digital-to-analog or analog-to-digital converters, signal processors, or the like). A user can operate input devices of user interface 206 to invoke the functionality of portable device 202 and can view and/or hear output from portable device 202 via output devices of user interface 206.

Network interface 208 can provide data communication capability for portable device 202. For example, portable device 202 can receive road height data from road height generation system via network 250 at network interface 208. Network interface 208 can include receiver components for receiving GPS signals. The received GPS signals can allow navigation application 210 to determine the location of portable device 202 so that navigation application 210 can display a map indicating the current location on portable device 202 on display 212. Network interface 208 may include radio frequency (RF) transceiver components for accessing wireless voice and/or data networks (e.g., using cellular telephone technology, advanced data network technology such as 3G or EDGE, WiFi (IEEE 802.11 family standards), or other mobile communication technologies, or any combination thereof), components for short-range wireless networking (e.g., using Bluetooth standards), and/or other components. Network interface 208 can provide wired network connectivity (e.g., Ethernet) in addition to or instead of a wireless interface. Network interface 208 can be implemented using a combination of hardware (e.g., driver circuits, antennas, modulators/demodulators, encoders/decoders, and other analog and/or digital signal processing circuits) and software components.

Portable device 202 can also include other components (not explicitly shown). For example, in various embodiments portable device 202 can include one or more storage devices using fixed or removable storage media. Navigation application 210 may be stored by a storage device and executed by controller 204. Road network data, such as received road height values, may also be stored by a storage device of portable device 202. Portable device 202 may include a battery, power controllers, and other components operable to provide various enhanced capabilities. At any given time, some or all of the program code to be executed can be resident in controller 204 and/or in storage media.

Road height generation system 252 can include processing subsystem 254, storage device 256 and network interface 258. Road height generation system 252 can be implemented at a server or a server farm. Various road height generation systems may include components not explicitly shown in FIG. 2, including but not limited to user interface components (keyboard, display, etc.).

Processing subsystem 254, also referred to as a "computing device," can be implemented as one or more integrated circuits, e.g., one or more single-core or multi-core microprocessors or microcontrollers, examples of which are known in the art. In operation, processing system 254 can control the operation of road height generation system 252. In various embodiments, processing subsystem 254 can execute a variety of programs in response to program code and can maintain multiple concurrently executing programs or processes. At any given time, some or all of the program code to be executed can be resident in processing subsystem 254 and/or in storage media such as storage device 256.

Storage device 256 can be implemented, e.g., using disk, flash memory, or any other non-transitory storage medium, or a combination of media, and can include volatile and/or non-volatile media. Storage device 256 can store data, such as road network data 260. For example, storage device 256 may include a database in which road network data 260 is stored. In some embodiments, storage device 256 can store one or more application programs to be executed by processing subsystem 254. For example, storage device 256 can store road height generation application 262, which can be executed by processing subsystem 254. Road height generation application 262 can use an optimization algorithm to determine road heights for a roadway network based on input data including locations of junctions and the stacking order of roads at grade separated crossings. The road heights determined by road height generation application 262 can be transmitted from road height generation system 252 to portable device 202.

Network interface 258 can provide data communication capability for road height generation system 252. For example, road height generation system 252 can provide road height data to portable device 202 via network interface 258. Network interface 258 can provide wired network connectivity (e.g., Ethernet) to connect road height generation system 252 to network 250 (e.g., the Internet). Network interface 258 can provide wireless network connectivity (e.g., RF, Bluetooth, WiFi, etc.) in addition to or instead of a wired interface. Network interface 258 may include communication components such as radio frequency (RF) transceiver components, components for short-range wireless networking, and/or other components. Network interface 258 can be implemented using a combination of hardware (e.g., driver circuits, antennas, modulators/demodulators, encoders/decoders, and other analog and/or digital signal processing circuits) and software components.

It will be appreciated that the system configurations and components described herein are illustrative and that variations and modifications are possible. The portable device and/or accessory may have other capabilities not specifically described herein (e.g., mobile phone, global positioning system (GPS), broadband data communication, Internet connectivity, etc.).

Further, while the portable device and road height generation system are described herein with reference to particular blocks, it is to be understood that these blocks are defined for convenience of description and are not intended to imply a particular physical arrangement of component parts. Further, the blocks need not correspond to physically distinct components. Blocks can be configured to perform various operations, e.g., by programming a processor or providing appropriate control circuitry, and various blocks might or might not be reconfigurable depending on how the initial configuration is obtained. Embodiments of the present invention can be realized in a variety of apparatus including electronic devices implemented using any combination of circuitry and software.

In some embodiments, one or more of road network data 260 and road height generation application 262 can be stored on portable device 202, for example, in controller 204 or in a storage device of portable device 202. The road height generation application can be executed by controller 204. Accordingly, in some embodiments, system 200 may not include road height generation system 252.

III. Road Network Data

Road network data (e.g., road network data 260 of FIG. 2) can include coordinates along each road of a road network area. A latitude and a longitude of a road centerline may be provided for a sequence of points along each road. For example, the sequence of points may occur at periodic intervals along each road.

Two or more roads may meet at a junction. An intersection is a type of junction in which two or more roads meet at the same elevation. A grade separated crossing (e.g. an overpass) is a type of junction in which a first road is at a different height from a second road, e.g., in which a first road passes over a second road.

Figure 3:
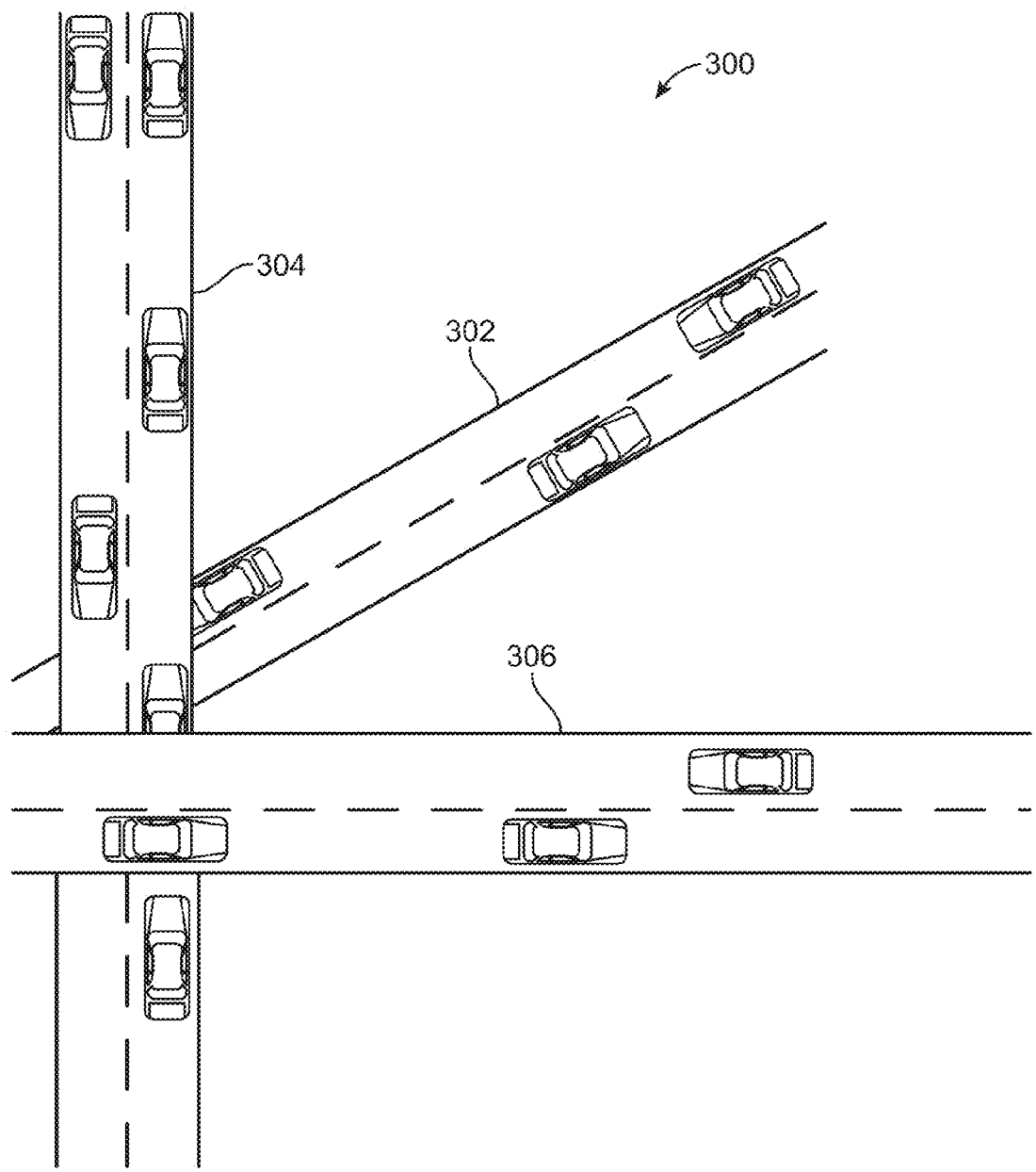
FIG. 3 is an illustrative grade separated crossing.

FIG. 3 shows an illustrative grade separated crossing 300 in which road 302 passes under road 304 and in which road 306 passes over road 304. Road network data can include junction data. For each road of a junction, junction data can include a latitude and longitude of the junction and stacking order of the road in the junction. For example, in FIG. 3, roads 302, 304 and 306 may be assigned a stacking order of 0, 1 and 2, respectively. A stacking order of 0 can indicate that road 302 does not overpass (and is thus not "stacked" on) any other roads. A stacking order of 1 can indicate that road 304 overpasses (and is thus "stacked" on) another road. A stacking order of 2 can indicate that road 306 overpasses two roads.

A road network area may be all roads known to a map data supplier or a subset of all roads, such all roads of a country, state, city, or other delimited area. In some embodiments, a road network area includes all roads in a particular road network map section, such as a 60 mile by 60 mile square area within a map. A road network map may be algorithmically sectioned into road network areas having uniform area, uniform road density, etc. Map sections may be selected such that the boundaries of the map section do not cross any junctions.

Using road network data, a road height generation application (e.g., road height generation application 262 of FIG. 2) can estimate a height of a road relative to another road at a grade separated crossing. Road height generation application 262 can determine height values for roads of the road network given only latitude, longitude, and stacking order data for the roads.

IV. Optimization

Embodiments calculate height values for roads of the network area using optimization of a cost function (e.g., a convex cost function). Road height generation application 262 calculates road height values subject to a set of predefined constraints on the cost function. In some embodiments, road height generation application 262 also calculates various auxiliary variables. An auxiliary variable is an extra variable used in conjunction with the variable for which a value is sought (i.e., the height value variable) to improve the precision of the estimated height values. For example, road height generation application 262 may determine road height values using auxiliary variables that correspond to a maximum height separation between a junction and its neighboring junctions.

Figure 4:
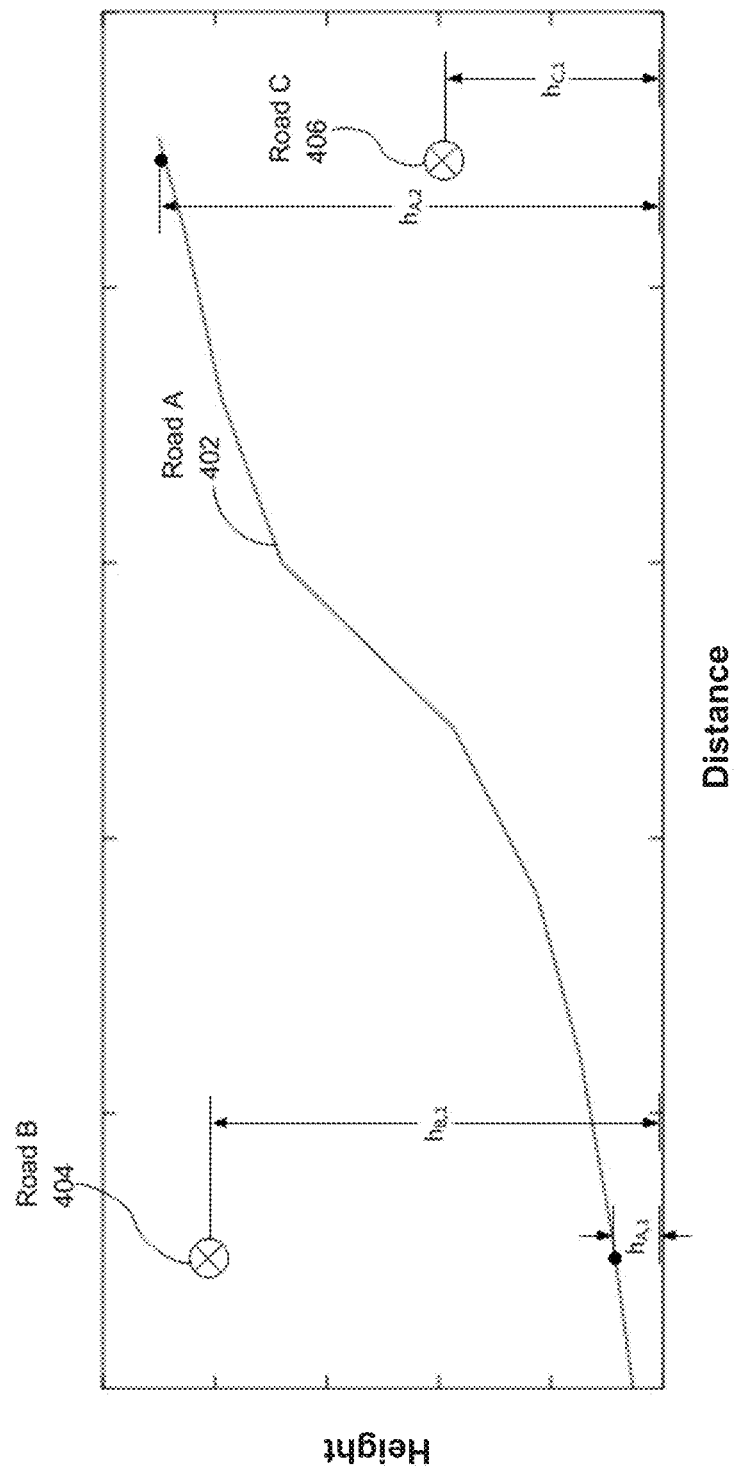
FIG. 4 is an illustrative graph showing height values for roads of two grade separated crossings.

FIG. 4 illustrates height values for roads of two exemplary grade separated crossings. Road A is shown at 402. Road B, shown passing through the plane of the page at 404, overpasses Road A (402). At the junction of Road A and Road B, Road A may have a stacking order of 0 and Road B may have a stacking order of 1. Road A (402) overpasses Road C, which is shown passing through the plane of the page at 406. At the junction of Road A and Road C, Road C can have a stacking order of 0 and Road A can have a stacking order of 1.

The actual heights of the roads at these junctions are not known, but the order is, as mentioned above. The heights of the different roads at these junctions are used as variables in a cost function C. The cost function can then be optimized (e.g., to find a minimum or maximum value) to obtain plausible heights of the roads. The heights are not necessarily the actual heights of the roads at the junctions, but are plausible to the extent that a 3D rendering of the roads can be provided. Accordingly, a cost function $C(h_{A,1}, h_{A,2}, h_{B,1}, h_{C,1})$ provides an output O for each set of height values (collectively referred to as H). The value of O is optimized for different values of H. The input values of H are also constrained, such that only certain values are possible. For instance, a minimum separation distance is specified so that if one road must be a minimum distance above another road. For example, the value of $h_{B,1} - h_{A,1}$ is constrained to be greater than a specified value. The cost function can be defined in various ways, e.g., as described below. In one embodiment, the height difference between roads at neighboring junctions is minimized. Thus, the distance between two grade separated crossings can be an input parameter that is used in the formulation for determining the value of C at a particular value of H, which can be considered as a vector variable.

By optimizing the cost function C, height values $h_{A,1}$ and $h_{A,2}$ have been calculated for points 1 and 2 along Road A based on the known stacking order of all the roads in the road network area including Roads A, B, and C. Height value $h_{B,1}$ has been calculated for Road B at the intersection of Road A and Road B. Height value $h_{C,1}$ has been calculated for Road C at the intersection of Road A and Road C. Thus, the height value shown are possible values that might optimize C, or could be intermediate values of H that are used during the optimization process, but other values of H can provide a lower cost value (output O) than the height values shown.

Figure 5:
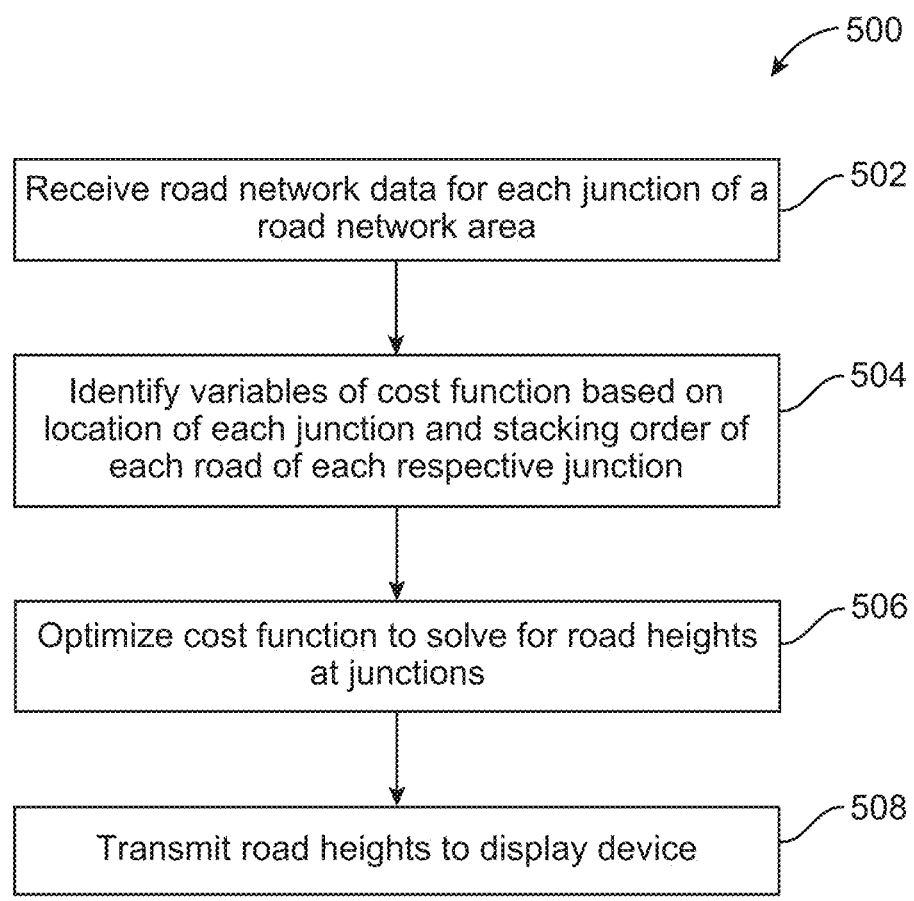
FIG. 5 is a flow diagram of a process for generating road heights for a road network area, in accordance with an embodiment of the invention.

FIG. 5 is a flowchart of a process 500 for generating road heights for a road network area according to an embodiment of the invention. Process 500 can be implemented with processing subsystem 254 of road height generation system 252.

At block 502, road network data for each junction of a road network area is received. For example, when road height generation application 262 is executed by processing subsystem 254, road height generation application may read road network data 260 from storage device 256. Road network data can include one or more of longitude, latitude, road designation, and stacking order for each junction in a road network area. Road network data can further include longitude, latitude and road designation data at non junction locations in a road network area. A road designation may be, for example, a number or name identifying a road.

At block 504, the variables of a cost function are identified based on the location of each junction and stacking order of each road in a grade separated crossing. For example, the number of grade separated crossings can be identified (along with the number of roads at the crossings) to determine a number of height variables. The constraints for the height values can also be identified in this block. This may be done by receiving a routine that defines the constraints (e.g., a routine that provides a Boolean result of whether a particular set of height values violate the constraints, and potentially an identification of which height values violate the constraints).

At block 506, the cost function can be optimized to solve for road heights at each junction. In some embodiments, height values at non junction locations along roads can be generated. For example, the cost function can be optimized to solve for height values at non-junction locations, as is described later. Alternatively, height values at non junction locations can be determined after the height values at junctions are determined with the cost function.

In some embodiments, the optimization problem is defined using a solver. For example, a solver such as COIN-OR Linear Programming (CLP) solver may be used. A set of constraints and an objective function can be specified for use by the solver. The solver performs the optimization to solve for road height values.

At block 508, the road height values generated by the solver are transmitted to a display device. For example, road height generation system 252 may transmit the road heights to portable device 202 which can display navigation data generated using the road heights on display 212.

An optimization problem can minimize a function subject to certain constraints. When an optimization problem seeks to minimize a function, a cost function is used. The term "optimal" refers to any value that is determined to be numerically better than one or more other values. In some embodiments, an optimal term is sought that is no worse than any feasible value. For example, an optimal value determined as the result of an optimization is not necessarily the best possible value, but may simply satisfy a criteria (e.g., a change in a cost function from a previous value is within tolerance). The optimal solution can be one that is not the very best possible solution, but simply one that is better than another solution according to a criterion. Such an optimal solution encompasses 'near-optimal' solutions. The term 'near-optimal' is used to express the fact that in a large-dimensional optimization problem system with a large number of constraints, the exact global optimum cannot be determined by a brute force search through all possible control value combinations. In some cases, it is therefore not possible to know if an optimization method produces the true global optimal solution with the lowest associated cost. In practice, however, it is often more important to determine within a reasonable amount of computational time a set of height values that have a preferably much lower predicted total cost (oscillation of σ) than another set. Related to this observation, it suffices for most practical optimization problems to consider only discrete or discretized values without loss in practical value of the discovered near-optimal solutions.

In some embodiments, a set of optimal values is sought. For example, an optimization process may be repeated with increasingly relaxed constraints until an optimal solution is found.

V. Generating Road Height Values at Non-Junction Locations

Figure 6:
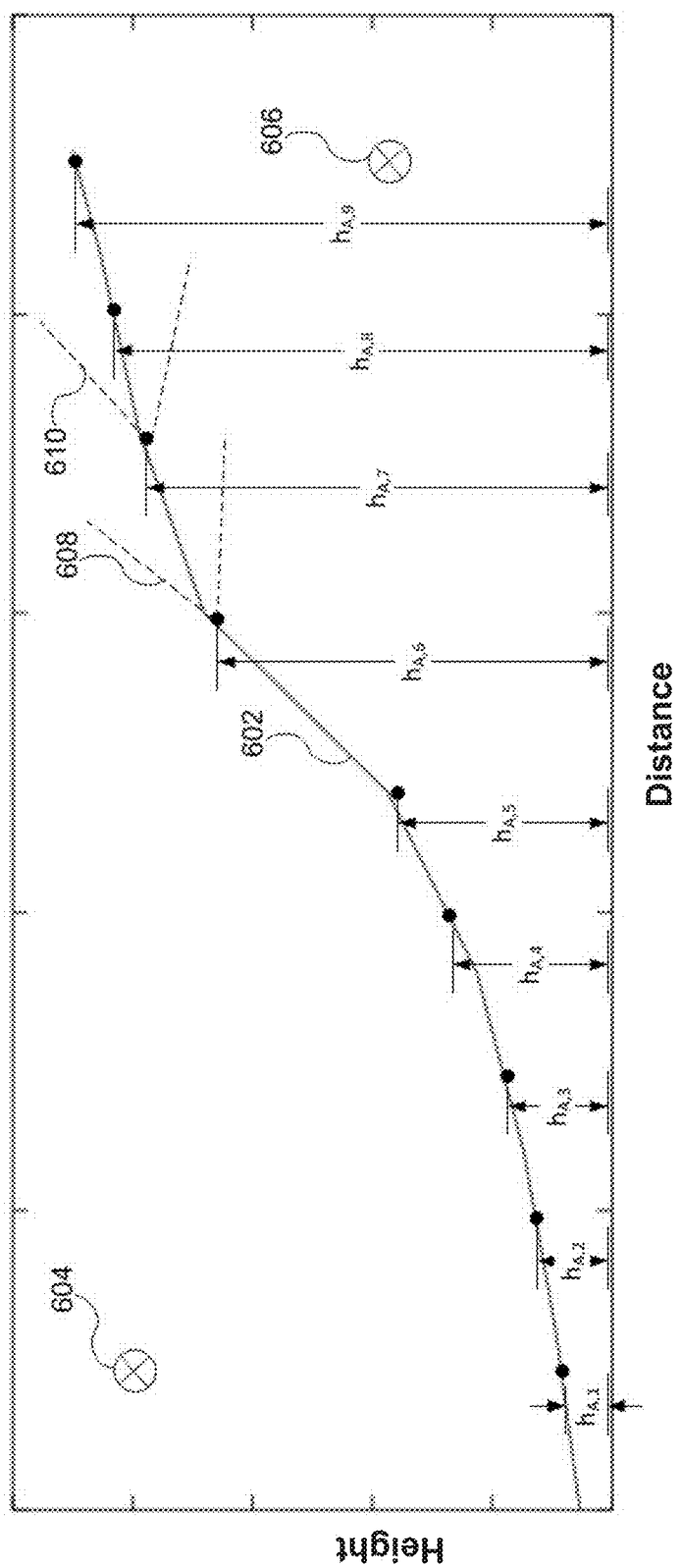
FIG. 6 is an illustrative graph showing height values junction and non junction locations along a road.

In some embodiments, height values are calculated at non junction locations. FIG. 6 shows illustrative height values generated for a road at junction and non junction locations. Illustrative height value $h_{A,1}$ is generated for Road A (602) at the junction of Road A (602) and Road B (604). Road B is shown emerging from the plane of the page as indicated by the icon at 604. Illustrative height value $h_{A,9}$ is generated for Road A (402) at the junction of Road A (402) and Road C (606). Road C is shown emerging from the plane of the page as indicated by the icon at 606. Illustrative height values $h_{A,2}$-$h_{A,8}$ are generated for Road A at non junction locations. Height values calculated at non junction locations may be constrained to improve the aesthetics of the road and provide for a plausible appearance. For example, slopes may be constrained in a widening cone from each junction such that sharp changes in height values do not occur near grade separated crossings. Dotted lines at 608 illustrate slope constraints that may be applied by road height generation application 262 when road height values are being calculated. In accordance with the illustrative constraint, the height value generated for $h_{A,7}$ is constrained to fall between the dotted lines. Similar slope constraints may be applied for $h_{A,8}$, as illustrated by dotted lines at 608, and for all height values calculated along each road of the road network area.

Figure 7A:
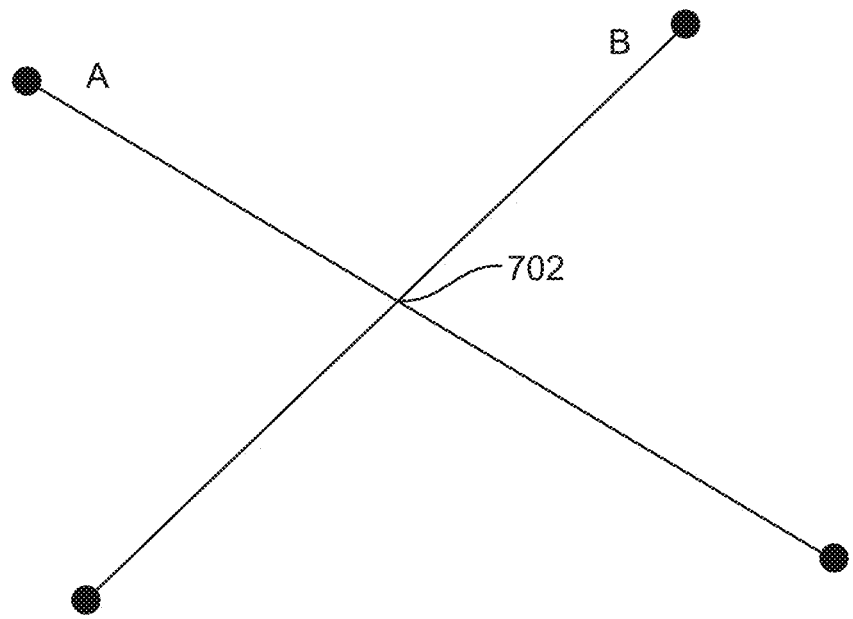
FIGS. 7A-7B are diagrams illustrating generation of polylines from road network data, in accordance with an embodiment of the present invention.
Figure 7B:
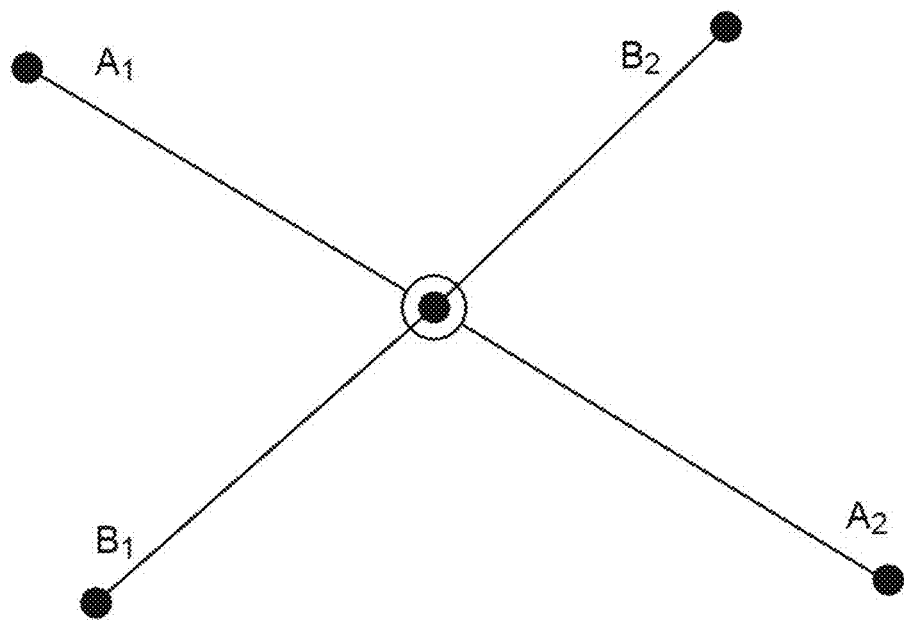

For determination of road height values at non junction locations, roads in the road network area can be modeled as polygonal center lines (i.e., "polylines"). In some embodiments, each junction is a polyline terminus, such that no two polylines cross each other. In FIG. 7A, road A and road B cross at location 702, with B being below A at the grade separated crossing 702. In FIG. 7B, each of the two roads A and B are split into polylines at junction 702. In this manner, a set of polylines is generated such that no two polylines cross each other. Road A is shown divided into polyline A1 and polyline A2, where A1 and A2 meet at a new junction "j2". Road B is shown divided into polyline B1 and polyline B2, where B1 and B2 meet at a new junction "j1". The ordering "j1" and "j2" expresses that j1 is below j2 in a grade separated crossing. For example, j1 may have a stacking order of 1 and j2 may have a stacking order of 2.

Polylines may be resampled such that a greater number of height values may be calculated along a polyline having an endpoint at a grade separated crossing than a polyline having no endpoints at a grade separated crossing. The polylines are "sampled" at a greater rate (i.e., a greater number of height variables are determined for the polyline) when a polyline has an endpoint at a grade separated crossing. Each sample can correspond to a road height value generated for a point on the polyline. Polylines having at least one endpoint at a grade separated crossing can be sampled densely. Polylines that do not have an endpoint at a grade separated crossing can be sampled sparsely. For example, a densely sampled polyline may have a first fixed number of samples, such as 100 samples per polyline, that is greater than a number of samples for a sparsely sampled polyline, such as 10 samples per polyline. In another example, a densely sampled polyline may have a first fixed number of samples per distance, such as 1000 samples per mile, and a sparsely sampled polyline may have a second fixed number of samples per distance, such as 100 samples per mile. Resampling polylines densely and sparsely allows generation of gradual slopes for polylines that terminate in a grade separated crossing.

The non-negative real value that specifies the height of the $x^{th}$ point on the centerline of road r may be denoted as $h_{r,x}$. (For an example, see $h_{A,1}$ of FIG. 6.) For any polyline (road) r that has n points, $h_{r,1}$ and $h_{r,n}$ correspond to the junctions at the extremities of polyline r.

Figure 8:
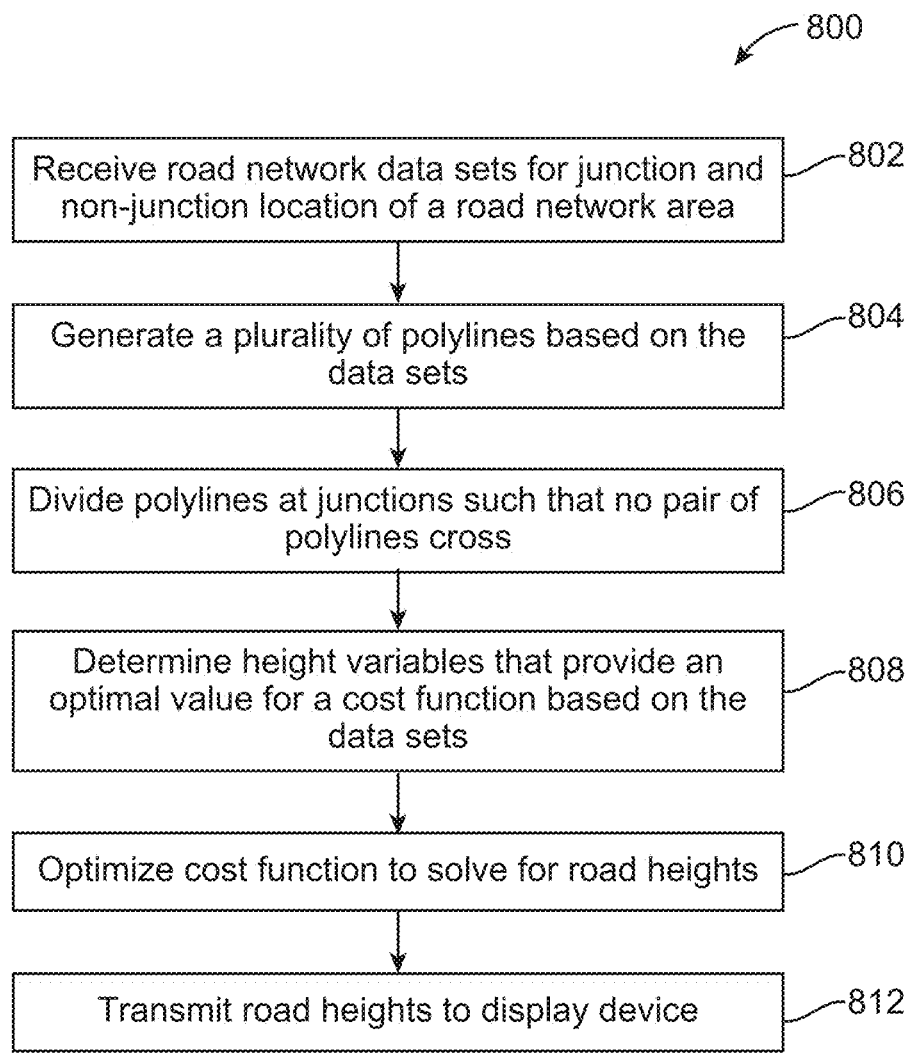
FIG. 8 is a flow diagram of a process for generating road heights using polylines, in accordance with an embodiment of the present invention.

FIG. 8 is a flowchart of a process 800 for generating road heights using polylines. Process 800 can be implemented with processing subsystem 254 of road height generation system 252.

At block 802, road network data sets for each road of a road network area is received. Road network data sets may include one or more of a road designation, a latitude, a longitude, and a stacking order for each road of a junction. For example, road data sets for a junction may include a stacking order and road data sets for non junction locations may not include a stacking order. Road network data can include one or more of longitude, latitude, road designation, and stacking order for each junction in a road network area. Road network data can further include longitude, latitude and road designation at non junction locations in a road network area.

At block 804, a plurality of polylines are generated based on the received data sets. Each polyline corresponds to a road of the road network area. In some embodiments, polylines corresponding to segments of the roads are generated such that polylines terminate at junctions and no two polylines cross.

At block 806, the polylines are divided at junctions such that no pair of polylines intersect. The polylines may be resampled such that the polylines terminating at grade separated crossings are densely sampled.

Height variables can be determined that provide an optimal value for a cost function based on the data sets, as indicated at 808.

The cost function can be optimized to solve for road heights, as indicated at block 810.

At block 812, the road height values generated by the solver are transmitted to a display device. For example, road height generation system 252 may transmit the road heights to portable device 202 which can display navigation data generated using the road heights on display 212.

VI. Example Cost Function and Constraints

In some embodiments, calculation of road height values may involve calculating values for an auxiliary variable. For example, the maximum height separation between a junction i and all of its neighboring junctions can be an auxiliary variable denoted $\sigma_i$. A technique for presenting a map having plausible variance in road height values between neighboring junctions involves adding $\sigma_i$ values over all junctions k, which causes the optimization to limit oscillations between junctions.

To obtain road height values, height values can be assigned to polyline points $h_{r,x}$ and junction height separation values can be assigned to $\sigma_i$ at the k junctions such that the following linear objective function is minimized:

$$\sigma = \sum_{i=1}^{k} \sigma_i$$

In this embodiment, $\sigma$ is used only for the purpose of calculating plausible height values. The values obtained for $\sigma_i$ are dispensed with after the height values are obtained and play no subsequent role outside of the convex optimization part of the algorithm. A purpose of $\sigma$ is to restrict the degree to which the polyline may oscillate in the height dimension to present a plausible and aesthetically appealing rendering of the roads by the navigation application.

In one sense, the values for $\sigma_i$ are a function of the height variables $h_{r,x}$, since if the height variables have a greater difference with respect to the neighboring height variables, then $\sigma$ will be greater. In one embodiment, the sum of the $\sigma_i$ can be the entire cost function, subject to constraints. The process of determining the $\sigma_i$ can be done by analytically determining the maximum value for each junction using the current height values of the neighboring junctions. Alternatively, one could iteratively change the values of $\sigma_i$ until a constraint of being below a separation of one of the height values is violated. In such an embodiment, once the values of $\sigma_i$ are found for the current height variables $h_{r,x}$, then the sum is determined. If the sum is less than the sum for a previous set of height variables, then the current height variables can be accepted. And, then a new set of height variables $h_{r,x}$ are determined, and the iterative process continues. One skilled in the art will be aware of the various optimization techniques that can be used.

In other embodiments, other terms can exist besides the sum of $\sigma_i$. The constraints can also be soft constraints, which are provided as other terms in the cost function, as oppose to hard constraints where such a solution is not even possible. The soft constraint terms can increase in value as the height values deviate more from a constraint (e.g., a minimum height distance, or any of the constraints mentioned below).

To create a rendering of a grade separated crossing having a plausible appearance, one or more constraints can be applied to the optimization problem.

Grade Separation Constraints

In some embodiments, a grade separation constraint is applied to the optimization. The grade separation constraint may be a plausible minimum height separation between roads having a consecutive stacking order in a grade separated crossing. For example, a minimum height in the range of 10-30 feet, e.g., 18 feet, may be used.

Figure 9:
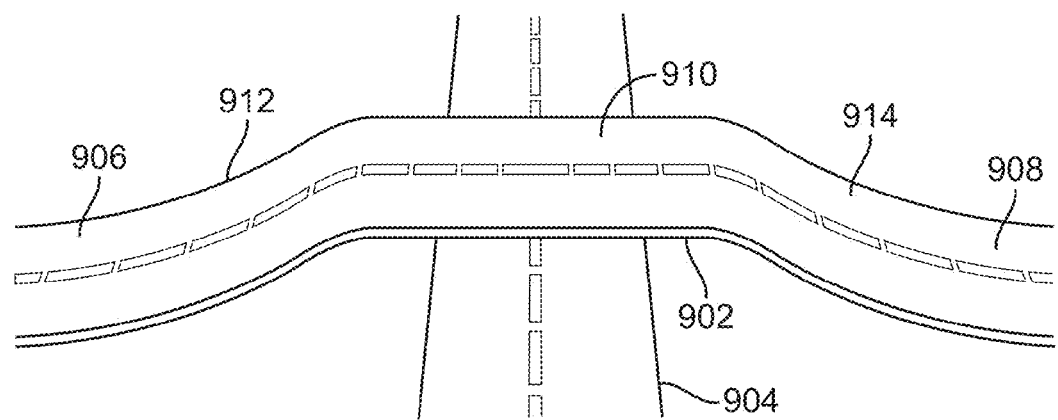
FIG. 9 is an illustrative grade separated crossing showing illustrative ascending and descending slopes of a road passing over another road.

Slope Constraints

Where a first road crosses over a second road at a grade separated crossing, the first road may have an ascending slope and a descending slope proximate to the overpass. Referring to FIG. 9, road 902 is shown overpassing road 904. At points 906 and 908, which are relatively far from the grade separated crossing, road 902 and 904 have the same elevation. At point 910, road 902 passes over road 904. Road 902 ascends as shown at sloped road section 912 and descends as shown at sloped road section 914 to create region 910 in which road 902 passes over road 904.

A slope constraint may be applied to the optimization. It may be desirable for aesthetic purposes that the slope of a road near the junction is limited. The goal is to have a constraint that is sufficiently flexible to allow a polyline to meet two junctions separated by a large height value and sufficiently constraining to disallow sharp changes in height values close to junctions. It may be desirable that a sloped road has a greater slope at regions of the road that are further from the junction (e.g., point 912) and a smaller slope at regions of the road that are closer to the junction (e.g., point 910). For example, the following constraint may be used:

$$-\beta_{r,x} \leq h_{r,x} - h_{r,x+1} \leq \beta_{r,x}$$

The bound used in constraining the slope of the polyline can be a function of distance along a polyline from the center of a polyline. Above, $\beta_{r,x}$ is inversely related to the distance of the $x^{th}$ point from the polyline center, along the polyline.

Monotonicity Constraints

While the slope constraints on any given polyline add plausibility and improved aesthetics to maps rendered according to the heights generated by road height generation application 262, they do not rule out the possibility of "kinks" appearing where the height drops near the center of a polyline and rises again at the next point. These kinks can be corrected by introducing monotonicity constraints on heights along any polyline. For example, the following constraints can be enforced for road r:

$$h_1 \geq h_2 \geq \ldots \geq h_{n-1} \geq h_n$$

or, $$h_1 \leq h_2 \leq \ldots \leq h_{n-1} \leq h_n$$

Specifically, for points x−1, x, and x+1, the following constraint can be enforced:

$$h_{x-1} - h_x \geq 0$$

$$h_x - h_{x+1} \geq 0$$

or, $$h_{x-1} - h_x \leq 0$$

$$h_x - h_{x+1} \leq 0$$

The following rule can be enforced: if the start of polyline r has a stacking order no lower than the stacking order of the junction where r terminates, then $$h_x - h_{x+1} \geq 0$$

else, $$h_x - h_{x+1} \leq 0$$

Other generalizations of such constraints do exist, e.g., $$(h_{x-1} - h_x) \cdot (h_x - h_{x+1}) \geq 0$$

Coverage Constraints

In some embodiments, a set of coverage constraints assigns values to auxiliary variables that play a role in the objective function to be optimized. For example, a 1-dimensional ball centered at a junction i having radius $\sigma_i$ covers its neighboring junction j (i.e., the other endpoint of the polyline that is incident upon i) if the difference in the height values assigned to i and j differ by at most $\sigma_i$.

Figure 10:
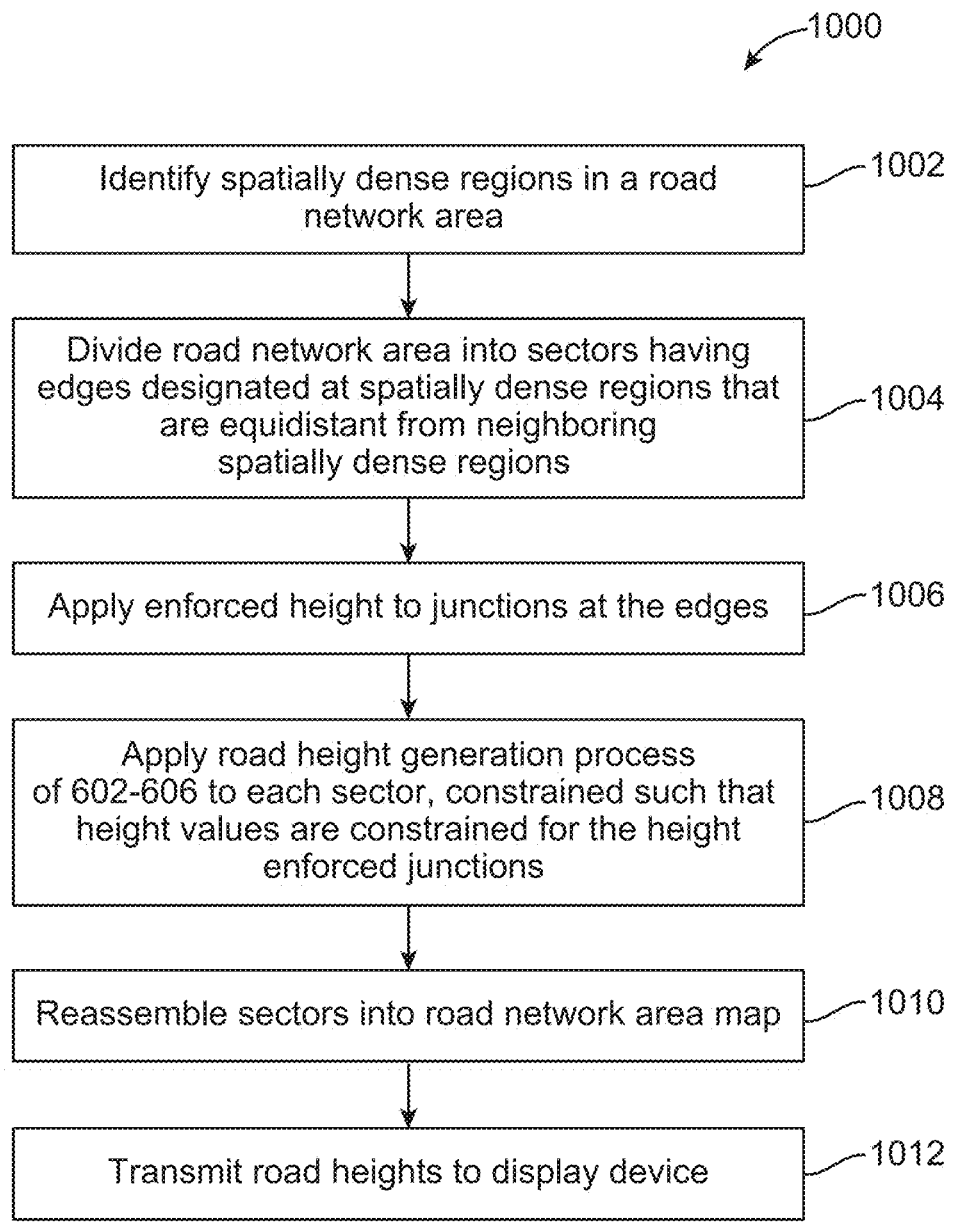
FIG. 10 is a flow diagram of a process for generating road heights for a road network area such that oscillations are not minimized when points are separated by large distances, in accordance with an embodiment of the invention.

In some embodiments, where points are separated by several miles, height values can be scaled at such points independently of the calculation of height values for other points. FIG. 10 is a flowchart of a process 1000 for generating road heights for a road network area such that oscillations are not minimized when points are separated by large distances, according to an embodiment of the invention. Process 1000 can be implemented with processing subsystem 254 of road height generation system 252.

At block 1002, spatially dense regions in a road network area can be identified.

A Voronoi partition of the road network area is constructed in which edges are designated at spatially dense regions that are equidistant from neighboring spatially dense regions, as indicated at block 1004. In this manner, the road network area is partitioned by the edges into sectors.

At the edges, height enforced junctions can be introduced where a particular height value (e.g., 0) is enforced, as indicated at block 1006.

The road height generation process described with reference to 502-506 of FIG. 5 may be solved on each sector, constrained such that height values are enforced for the height enforced junctions, as indicated at block 1008.

The partitions can then be reassembled into a road network area map, as indicated at block 1010.

At block 1012, road height values generated by the solver are transmitted to a display device.

Referring to FIGS. 11A-11B, exemplary polyline profiles generated in accordance with the approach described herein are shown. In these profiles, the constraints on the allowable slope are scaled such that a steeper descending (or ascending) slope is allowed near the middle of the polyline. For example, the middle region of the polyline shown in FIG. 11A, located between 100 and 150 feet on the distance axis, has a steeper slope than the sections of the polyline between 0 and 100 feet and between 150 and 250 feet. Similarly, the middle of the polyline shown in FIG. 11B is located between 10 and 15 feet on the distance axis, and a steeper slope occurs in this region than in the regions of the polyline that are further from the median. This illustrates application of a slope constraint that is a function of distance along a polyline from the center of a polyline.

Figure 12A:
FIGS. 12A-12C are exemplary top-down views of a map section generated in accordance with an embodiment of the present invention.
Figure 12B:
Figure 12C:

Referring to FIGS. 12A-12C, exemplary top down views of the Interstate 280 and Interstate 101-North interchange in San Francisco, California, generated in accordance with the approach described herein, are shown. In FIG. 12A, polylines having height values that fall within the range of 0-15' are shown in bold. In FIG. 12B, polylines having height values that fall within the range of 15-20' are shown in bold. In FIG. 12C, polylines having height values that fall within the range of 15-25' are shown in bold.

The embodiments described herein allow road height data to be generated based on limited road network data. For example, given road network data that is limited to latitude, longitude, road designations for points along road centerlines, and stacking order of roads at junctions, it is possible to calculate road heights. The road heights can be generated by modeling the problem of calculating heights as an optimization problem. An objective function can be minimized to determine road heights. In some embodiments, various constraints are applied to the objective function. For example, a minimum height separation between stacked roads may be applied as a constraint. The objective function sums σ values representing the maximum height separation between a junction and its neighboring junctions over all junctions in a road network area. By minimizing the objective function, height oscillations from junction to junction are kept small. In this way, height values are calculated for each point in each polyline (road segment). The resulting height values can be used to generate a three-dimensional rendering of a map on a navigation device.

Embodiments can be realized using any combination of dedicated components and/or programmable processors and/or other programmable devices. The various processes described herein can be implemented on the same processor or different processors in any combination. Accordingly, where components are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for interprocess communication, and different pairs of processes may use different techniques, or the same pair of processes may use different techniques at different times. Further, while the embodiments described above may make reference to specific hardware and software components, those skilled in the art will appreciate that different combinations of hardware and/or software components may also be used and that particular operations described as being implemented in hardware might also be implemented in software or vice versa.

Computer programs incorporating various features of the present invention may be encoded on various computer readable storage media; suitable media include magnetic disk or tape, optical storage media such as compact disk (CD) or DVD (digital versatile disk), flash memory, and the like. Computer readable media encoded with the program code may be packaged with a compatible electronic device, or the program code may be provided separately from electronic devices (e.g., via Internet download).

While the invention has been described with respect to specific embodiments, one skilled in the art will recognize that numerous modifications are possible. Thus, although the invention has been described with respect to specific embodiments, it will be appreciated that the invention is intended to cover all modifications and equivalents within the scope of the following claims.

What is claimed is:

1. A method for generating road height values for a road network area that includes a plurality of junctions, the method comprising:

receiving, by a computing device, a data set for each junction in the road network area, wherein each data set includes a road designation, a first coordinate, a second coordinate, and a stacking order for each road of a respective junction, wherein the plurality of junctions include a plurality of grade separated crossings, a grade separated crossing including at least two roads having a different stacking order signifying that the at least two roads have different heights;

determining, by the computing device, height variables that provide an optimal value for a cost function based on the road data set for each junction, wherein height values of roads of a grade separated crossing are constrained:
  to satisfy the stacking order of each road in the junction, and
  to have a minimum distance between roads having consecutive stacking order values, wherein, for each of the plurality of junctions, a height separation between the junction and all of its neighboring junctions is minimized in the cost function; and transmitting, from the computing device to a display, data based on the height values for displaying, by the display, a three-dimensional map of a part of the road network area using the height values.

2. The method of claim 1, wherein the first coordinate is a latitude and the second coordinate is a longitude.

3. The method of claim 1, further comprising receiving data sets at non junction locations along the roads, wherein a data set at a non junction location includes at least a road designation, a first location coordinate, and a second location coordinate.

4. The method of claim 1, further comprising generating height values at non junction locations along the roads.

5. The method of claim 4, wherein a slope of height values between junctions is constrained in the cost function.

6. The method of claim 4, wherein a monotonicity constraint is applied to the height values between junctions.

7. The method of claim 1, further comprising generating a plurality of polylines based on the data sets, wherein each polyline corresponds to a road of the road network.

8. The method of claim 7, further comprising dividing the plurality of polylines at junctions such that no pair of polylines cross.

9. The method of claim 7, further comprising:
  for each polyline in the road network area, determining whether an endpoint of the polyline is a grade separated crossing;
  if an endpoint of the polyline is a grade separated crossing, resampling the polyline densely with respect to a first fixed parameter; and
  if no endpoint of the polyline is a grade separated crossing, resampling the polyline sparsely with respect to a second fixed parameter.

10. A non-transitory computer readable storage medium having program code stored thereon, the program code including instructions that, when executed by a processing subsystem of an electronic device, cause the processing subsystem to perform a method, the method comprising:
  receiving a data set for each junction in the road network area, wherein each data set includes a road designation, a first coordinate, a second coordinate, and a stacking order for each road of a respective junction; wherein the plurality of junctions include a plurality of grade separated crossings, a grade separated crossing including at least two roads having a different stacking order signifying that the at least two roads have different heights;
  determining height variables that provide on optimal value for a cost function based on the junction data set for each junction, wherein height values of roads of a grade separated crossing are constrained:
    to satisfy the stacking order of each road in the junction, and
    to have a minimum distance between roads having consecutive stacking order values, wherein, for each of the plurality of junctions, a height separation between the junction and all of its neighboring junctions is minimized in the cost function; and
  transmitting, from the processing subsystem to a display of a portable device, data based on the height values for displaying, by the display a three-dimensional map of the road network area using the height values.

11. The computer-readable storage medium of claim 10, wherein the processing subsystem is communicatively coupled to the portable device via a network interface.

12. The computer-readable storage medium of claim 10, wherein the method further comprises generating a plurality of polylines based on the data sets, wherein each polyline corresponds to a road of the road network.

13. The computer-readable storage medium of claim 12, wherein the method further comprises dividing the plurality of polylines at junctions such that no pair of polylines cross.

14. The computer-readable storage medium of claim 12, wherein the method further comprises:
  for each polyline in the road network area, determining whether an endpoint of the polyline is a grade separated crossing;
  if an endpoint of the polyline is a grade separated crossing, resampling the polyline densely with respect to a first fixed parameter; and
  if no endpoint of the polyline is a grade separated crossing, resampling the polyline sparsely with respect to a second fixed parameter.

15. A portable device comprising:
a network interface including:
receiving components for receiving global positioning system (GPS) signals and transceiver components for communicatively coupling the portable device to a road height generation system;
a controller configured to receive height values from the road height generation system via the network interface, wherein the height values are generated by a processing subsystem of the road height generation system, the processing subsystem configured to:
  receive a data set for each junction in a road network area, wherein each at a set includes a road designation, a first coordinate, a second coordinate, and a stacking order for each road of a respective junction; wherein the plurality of junctions include a plurality of grade separated crossings, a grade separated crossing including at least two roads having a different stacking order signifying that the at least two roads have different heights;
  determine height variables that provide on optimal value for a cost function based on the junction data set for each junction, wherein height values of roads of a grade separated crossing are constrained:
    to satisfy the stacking order of each road in the junction, and
    to have a minimum distance between roads having consecutive stacking order values, wherein, for each of the plurality of junctions, a height separation between the junction and all of its neighboring junctions is minimized in the cost function; and
a display configured to display a three-dimensional map of the road network area using the height values.

16. The portable device of claim 15, further configured to:
- determine a map segment to display, wherein the map segment corresponds to a location indicated by the received GPS signals;
- render a navigation image of the map segment, wherein the navigation image is based on the received height values.

17. The portable device of claim 15, wherein the processing subsystem is further configured to generate a plurality of polylines based on the data sets, wherein each polyline corresponds to a road of the road network.

18. The portable device of claim 17, wherein the processing subsystem is further configured to divide the plurality of polylines at junctions such that no pair of polylines cross.

19. The portable device of claim 17, wherein the processing subsystem is further configured to:
- for each polyline in the road network area, determine whether an endpoint of the polyline is a grade separated crossing;
- if an endpoint of the polyline is a grade separated crossing, resample the polyline densely with respect to a first fixed parameter; and
- if no endpoint of the polyline is a grade separated crossing, resample the polyline sparsely with respect to a second fixed parameter.

\* \* \* \* \*